July 15, 1924.

R. BOEHM

MOTOR VEHICLE

Filed Oct. 12, 1920

1,501,304

2 Sheets-Sheet 1

Inventor
Reinhold Boehm,
By Henry Orth Jr.
atty.

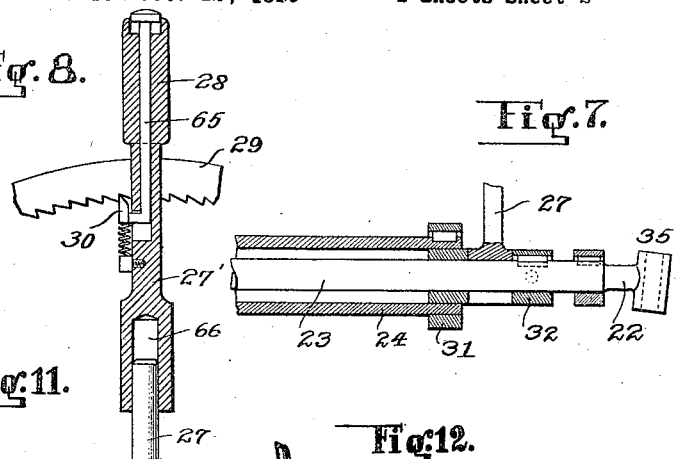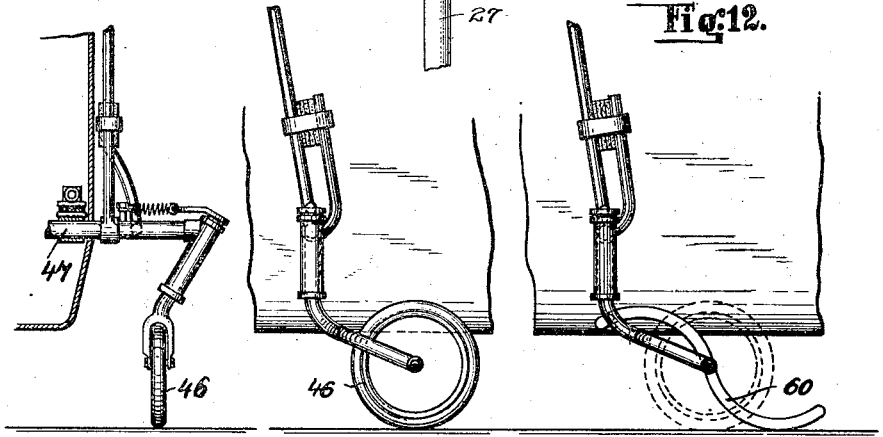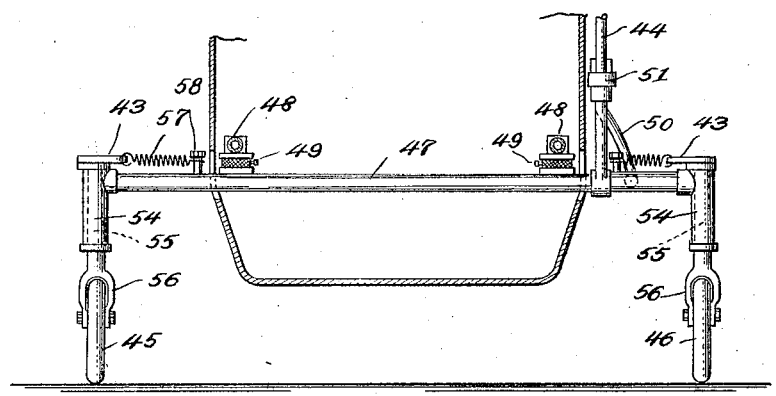

Patented July 15, 1924.

1,501,304

UNITED STATES PATENT OFFICE.

REINHOLD BOEHM, OF BERLIN-JOHANNISTHAL, GERMANY, ASSIGNOR TO ALFRED MORGAN, OF BERLIN, GERMANY.

MOTOR VEHICLE.

Application filed October 12, 1920. Serial No. 416,487.

*To all whom it may concern:*

Be it known that I, REINHOLD BOEHM, a citizen of Germany, residing at Berlin-Johannisthal, Germany, have invented certain new and useful Improvements in Motor Vehicles; and I do hereby declare the following to be a full, clear, and exact description of the invention, such as will enable others skilled in the art to which it appertains to make and use the same.

My invention relates to improvements in motor vehicles, and more particularly in motor vehicles of the type in which the body and the frame are supported on a pair of wheels arranged tandem fashion and in which at the sides of the body wheels are provided which are normally free from the ground but provide subsidiary supports in case the car tends to lose balance or to tilt sidewise for example when running in a curve. One of the objects of the improvements is to mount the said subsidiary wheels in such a way that they provide improved means for preventing the main or supporting wheels from slipping and causing the car to tilt sideways when the car is running in a curve. Another object of the improvements is to provide means for holding the subsidiary wheels which are rockingly mounted on an upright axis in the direction of the travel of the car. With these and other objects in view my invention consists in the matters to be described hereinafter and particularly pointed out in the appended claims.

Figure 1:
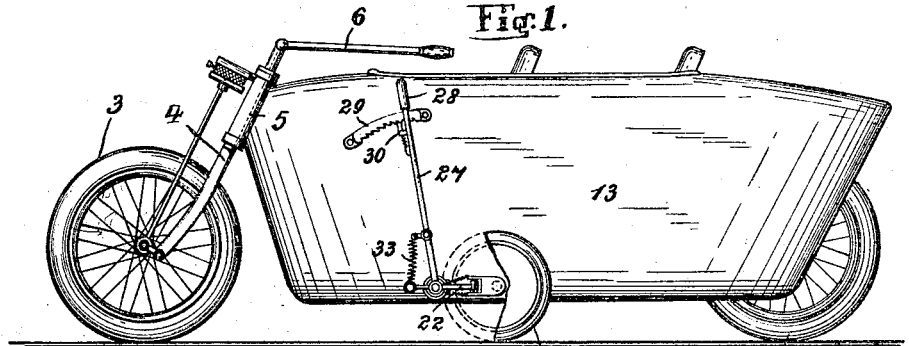
Figure 2:
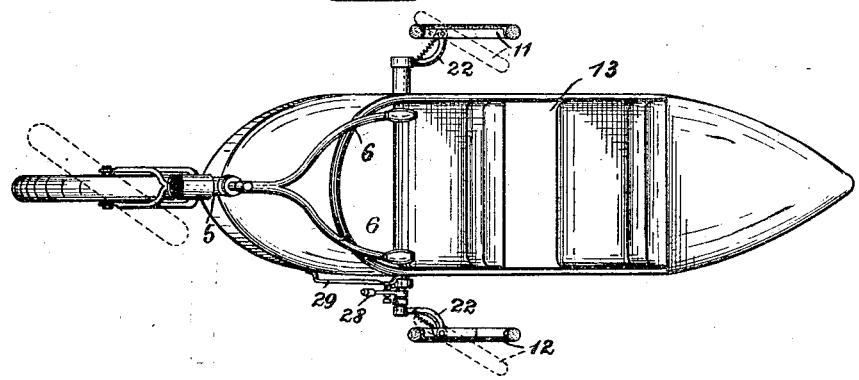
Figure 3:
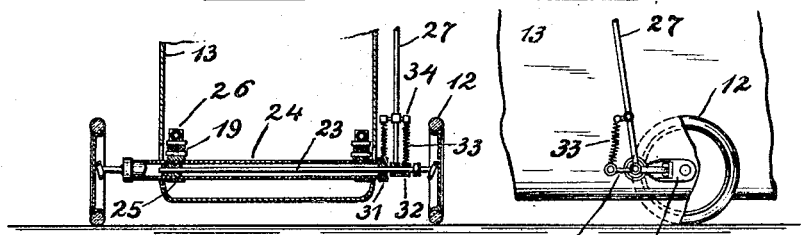
Figure 4:
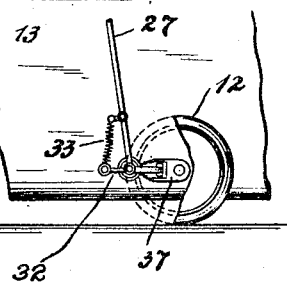
Figure 5:
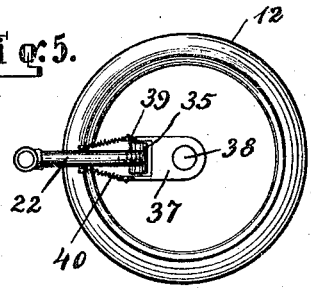
Figure 6:
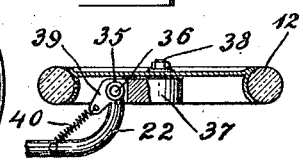

For the purpose of explaining the invention several examples embodying the same have been shown in the accompanying drawings, in which the same reference characters have been used in all the views to indicate corresponding parts. In said drawings, Fig. 1, is a side view of the car, Fig. 2, is a plan view thereof, Fig. 3, is a partial cross-section of Fig. 1, showing the subsidiary wheels and the transverse rock shaft carrying the same, Fig. 4, is a side view of Fig. 3, Fig. 5, is an enlarged side view of the wheel shown in Figs. 3 and 4, Fig. 6, is a horizontal cross-section of the wheel shown in Fig. 3, Fig. 7, is a detail sectional view on an enlarged scale showing a part of the transverse shaft carrying the side supporting wheels, Fig. 8, is a sectional view on an enlarged scale showing a detail, Fig. 9, is a cross-section of the car showing a modification, Fig. 10, is a detail view showing a modification of the subsidiary wheel and the manner of mounting the same, Fig. 11, is a side view of Fig. 10, Fig. 12, is a detail view showing a runner provided in lieu of a subsidiary wheel.

My improved motor consists of a frame of any preferred construction, a front or steering wheel 3 mounted in a bifurcated rod 4 rockingly mounted in a head 5 and carrying at its upper end a pair of steering arms 6. A rear or driving wheel 7 is mounted in the frame and a motor (not shown) is connected with the rear wheel by any suitable driving means.

At a part intermediate the front and rear wheels a transverse rock shaft is mounted on the main frame, which shaft consists of two telescoping sections 23 and 24. As shown the outer tubular section 24 is mounted in bearings 25, 25 connected by pneumatic cushions 19, 19 with side bars 26, 26 of the frame 1. On the part of the inner section 23 projecting from the tubular section 24 a lever 27 is journaled which is provided at its upper end with a handle 28. To the side of the body 13 of the car a toothed sector 29 is secured which is adapted to be engaged by a spring pressed pawl 30 provided on the lever 27 for locking the same in position. Means for throwing the pawl out of engagement with the sector 29 are common in the art. To show what may be done a rod 65 is slidable in a longitudinal bore of the upper part of lever 27'. Said rod has the pawl secured to its bottom end, and the pawl slides in a longitudinal slot made in the part 27'. As shown in Fig. 1 the lever 27 is made in two sections in sliding engagement with each other to permit the shaft 23, 24 to rock upwards without interfering with the proper engagement of the pawl 30 and the toothed sector 29. As appears from Fig. 1, the upper section 27' of the lever is provided at its bottom end with a socket 66 engaged by the top end of the lower section of the lever. This construction is necessary, because the shaft 23, 24 is yieldingly connected with the body 13 of the vehicle by reason of the cushions 19, and the lower section of the lever 27 takes part in the upward movement of the said shaft relatively to the body 13. At opposite sides of the lever 27 arms 31 and 32 extend forwardly from and are secured to the sectional shafts 23 and 24 respectively, and the ends of the said arms are connected by tension springs 33 with a cross-head 34 secured to the lever 27.

The outer ends of the sectional shafts 23 and 24 are provided with arms 22 curved outward and formed with sleeves 35 having upright axes and disposed within the side wheels 11 and 12 respectively, and to bolts 36 pivotally mounted within said sleeves blocks 37 are secured which are provided at their ends with transverse bores providing bearings for the axles 38 of the side wheels. In the preferred form shown in the figures the upright bolts 36 are inclined with their lower ends inwards, as is shown in Fig. 3.

The blocks 37 are formed with arms 39 and to the ends of the arms springs 40 are secured which are connected with their opposite ends to the arms 22 respectively, the springs and the arms being so disposed as to be in line with each other when the wheels 11 and 12 are disposed with their planes parallel to the longitudinal axis of the car and in the direction of the travel of the car.

The operation of this part of the car is as follows: By rocking the shaft sections 23, 24 by means of the lever 27 the side wheels 11 and 12 are set the desired distance away from the ground, both sections moving in unison by being connected with the lever 27 by the springs 33, which springs also permit upward movement of the wheels 11 and 12 independently of each other when running over an obstacle. In some cases I set the side wheels in such a way that they are in contact with the ground when the car is disposed with its vertical axis vertically to the road way, so that the car is practically supported on four wheels. If now the car is tilted sidewise, for example when running in a curve, one of the wheels 11 or 12 will receive an increased pressure. Therefore the pneumatic cushion 19 adjacent thereto will be compressed in a higher degree and the cushion 19 disposed at the opposite side of the car will be relieved to a certain extent. Therefore when the body of the car and its front and rear wheels are inclined laterally the shaft 23, 24 is rocked relatively thereto as far as is permitted by the pneumatic cushions 19, and the side supporting wheels remain in vertical position. This is an important feature of my invention, because thereby the wheels which are free to rock about the upright pivots 36 are not subject to lateral pressure which would tend to set the same angularly to the direction of the travel. In addition the wheels remaining more or less in vertical position are adapted to prevent side slip of the main wheel running in inclined positions.

Ordinarily I set the wheels a certain distance away from the ground, so that the car is running on two wheels. In this case one of the side wheels engages the ground when the car is inclined sideways.

An important feature of my invention resides in providing means such as springs 40 for holding the side wheels in the direction of travel, so that they are in proper position when they set on the ground. It will be understood that when permitting the wheels freely to rock about their upright axes 35, 36 they will in most cases be disposed at an angle to the direction of the travel, particularly when the shaft 23, 24 has been rocked for raising the side wheels from the ground and the axes 35, 36 of the wheels are inclined forwardly. In such cases the wheels will slide over the ground and when the car is tilted sideways they will impart thereto a heavy blow tending to upset the car. These faults are overcome by the springs 40 holding the side supporting wheels at the rear of the axes 36.

In the modification shown in Figs. 9 to 11, the side supporting wheels 45 and 46 are mounted on a solid shaft 47 connected with side bars 48 of the main frame of the car, pneumatic cushions 49, 49 being interposed between the bars and the shaft. To the shaft 47 an arm 50 is secured which has an elastic connection 51 with a lever 44 rockingly mounted on the shaft. The lever 44 is made in two sections in sliding engagement with each other the construction being the same as has been described with reference to Figs. 1-8. To the ends of the shaft 47 upright sleeves 54 are secured which provide rocking supports for pivot bolts 55 made integral with bifurcated arms 56 extending rearwards therefrom and carrying the side wheels 45, 46. At their upper ends the pivot bolts 55 are provided with arms 43 connected by tension springs 57 with pins 58 secured to the shaft 47, which springs have the function to hold the wheels 45 and 46 with their planes in the direction of the travel of the car. As shown the pivot bolts 55 are disposed vertically when the wheels 45 and 46 are in the positions shown in the figures. But it should be understood that the invention is not limited to this construction, and that in some cases the said bolts are inclined downwards and towards the body of the car, as is indicated in Fig. 10. However, also in this case the bifurcated arms 56 are constructed in such a way that the side wheels are disposed vertically to the ground.

The operation of the construction shown in Figs. 9 to 11 is substantially the same as has been described with reference to Figs.

1 to 8. By rocking the shaft 47 the side wheels 45 and 46 are set the desired distance away from the ground. When the car is running in a curve one of the wheels sets on the ground, and by reason of the spring 57 it is always in the proper position to roll on the ground. When the wheel is running over a stone or the like it is rocked upwards, the elastic connection 51 between the arm 50 and the lever 44 permits such movement.

Fig. 12 shows a construction in which the side wheels are adapted to be replaced by runners 60. As shown, the runners are secured to the ends of the bifurcated arms and they are held in their proper positions by being secured with their upper ends to the arms at a part near sleeves 54.

I claim:

1. In a motor car, the combination with the body, and a front and rear wheel disposed in tandem, of a transverse shaft mounted on the body of the car intermediate the wheels and adapted to automatically rock about the longitudinal axis of the vehicle independently of the latter, side supporting wheels eccentrically mounted on said shaft and means to rock said shaft about its axis whereby the side supporting wheels are moved towards and from the ground.

2. In a motor car, the combination with the body, and a front and rear wheel disposed in tandem, of a transverse rock shaft elastically mounted on the body of the car intermediate the wheels and adapted to rock automatically about the longitudinal axis of the vehicle independently of the latter, side supporting wheels eccentrically mounted on said shaft, and means to rock said shaft about its axis whereby the side supporting wheels are moved towards and from the ground.

3. In a motor car, the combination, with the body, and a front and rear wheel disposed in tandem, of side supporting wheels trailingly mounted on said body intermediate said front and rear wheels and adapted to be set in position away from the ground, and yielding means tending to hold the side supporting wheels substantially in the direction of the travel of the car.

4. In a motor car, the combination, with the body, and a front and rear wheel disposed in tandem, of side supporting wheels trailingly mounted on said body intermediate said front and rear wheels and adapted to be set in position away from the ground, and springs tending to hold the side supporting wheels substantially in the direction of the travel of the car.

5. In a motor car, the combination, with the body, and a front and rear wheel disposed in tandem, of side supporting wheels trailingly mounted on said body for rocking about upright axes and intermediate said front and rear wheels and adapted to be set in position away from the ground, and yielding means tending to hold the side supporting wheels substantially in the direction of the travel of the car.

6. In a motor car, the combination with the body and a front and rear wheel disposed in tandem, of a transverse shaft rockable on its axis and about the longitudinal axis of the car, side supporting wheels trailingly mounted on said shaft, and yielding means tending to hold the side supporting wheels substantially in the direction of the travel of the car.

7. In a motor car, the combination with the body and a front and rear wheel disposed in tandem, of a transverse shaft rockable on its axis and about the longitudinal axis of the car, side wheels trailingly mounted on said shaft and rockable about an upright axis, and yielding means to hold the side wheels substantially in the direction of the travel of the car.

8. In a motor car, the combination with the body, and a front and rear wheel disposed in tandem, of a transverse shaft rockable on its axis and about the longitudinal axis of the car, side supporting wheels trailingly mounted on said shaft, and springs tending to hold the side supporting wheels substantially in the direction of the travel of the car.

9. In a motor car, the combination with the body and a front and rear wheel disposed in tandem, of a transverse rock shaft consisting of two telescoping sections adapted to rock relatively to each other about their axis, and about the longitudinal axis of the car independently of the latter, elastic means connecting said sections, side supporting wheels eccentrically mounted on said shaft, and yielding means to rock said shaft to raise and lower the wheels.

10. In a motor car, the combination with the body, and a front and rear wheel disposed in tandem, of a transverse rock shaft mounted on the body of the car and consisting of two telescoping sections adapted to rock relatively to each other about their axis, and about the longitudinal axis of the car independently of the latter, side supporting wheels eccentrically mounted one on each of said sections, a hand lever journaled on one of said sections, and springs connecting said hand lever with said sections.

11. In a motor car, the combination with the body and a front and rear wheel disposed in tandem, of side supporting wheels, and a vertical axis for each wheel disposed eccentrically to the horizontal axis and located within the circumference of the wheel.

12. In a motor car, the combination with the body, and a front and rear wheel disposed in tandem, of side supporting wheels, a vertical axis for each wheel located within the circumference of the wheel, and yielding means tending to hold the side supporting wheels in the direction of the travel of the car.

13. In a motor car, the combination with the body, and a front and rear wheel disposed in tandem, of pivot bearings disposed at the sides of said body and inclined with their axes downwards and towards said body, and side supporting wheels trailingly mounted on said pivot bearings for rocking towards and away from said body.

14. In a motor car, the combination with the body, and a front and rear wheel disposed in tandem, of pivot bearings disposed at the sides of said body and inclined with their axes downwards and towards said body, side wheels trailingly mounted on said pivot bearings for rocking towards and away from said body, and yielding means tending to hold the side wheels in the direction of the travel of the car.

15. In a motor car, the combination with the body and a front and rear wheel disposed in tandem, of longitudinal frame members, a transverse shaft, bearings for the latter yieldingly connected with said frame members, means to rock the transverse shaft, arms connected with the latter having transverse bearing sleeves on their free ends, bearing blocks pivotally mounted in said sleeves and having transverse bores, and side wheels journaled in said bores.

16. In a motor car, the combination with the body and a front and rear wheel disposed in tandem, of longitudinal frame members, a transverse shaft, bearings for the latter yieldingly connected with said frame members, means to rock the transverse shaft, arms connected with the latter having transverse bearing sleeves on their free ends, bearing blocks pivotally mounted in said sleeves, having transverse bores, and side wheels journaled in said bores, and springs connecting the bearing blocks to the arms, for the purpose specified.

17. In a motor car, a body frame having longitudinal side bars, shaft bearings yieldingly connected with the side bars, a telescoping shaft journaled in the bearings transversely to the side bars, an operating lever journaled on one section of the shaft, arms fixed on the shaft sections, a cross head fixed on the lever, springs connecting the cross head to the arms on the shaft-sections, and side wheels pivotally connected with the transverse shaft.

In testimony whereof I hereunto affix my signature in the presence of two witnesses.

REINHOLD BOEHM.

Witnesses:
FRANK REINHOLD,
GERTRUD SCHWARZ.